(12) United States Patent
Peltomäki

(10) Patent No.: US 6,589,001 B2
(45) Date of Patent: Jul. 8, 2003

(54) HANDLING ARRANGEMENT FOR GOODS UNITS AND METHOD OF HANDLING OF GOODS UNITS

(75) Inventor: Tero Peltomäki, Vanha-Ulvila (FI)

(73) Assignee: Cimcorp Oy, Ulvila (FI)

( * ) Notice: Subject to any disclaimer, the term of this patent is extended or adjusted under 35 U.S.C. 154(b) by 29 days.

(21) Appl. No.: 09/817,702

(22) Filed: Mar. 26, 2001

(65) Prior Publication Data

US 2001/0038784 A1 Nov. 8, 2001

(30) Foreign Application Priority Data

Mar. 27, 2000 (FI) .............................. 20000704

(51) Int. Cl.⁷ .............................................. B65H 29/56
(52) U.S. Cl. ....................... 414/277; 414/807
(58) Field of Search ................. 414/275, 277, 414/289, 395, 807, 814

(56) References Cited

U.S. PATENT DOCUMENTS

| 3,040,914 A | * | 6/1962 | Johnson et al. ......... 193/35 SS |
| 3,186,566 A | * | 6/1965 | Spinager et al. ............... 280/24 |
| 3,434,604 A | | 3/1969 | Haldimann et al. |
| 3,998,343 A | * | 12/1976 | Fors ........................... 414/501 |
| 4,466,765 A | | 8/1984 | Mautino |
| 4,696,614 A | * | 9/1987 | Moen ......................... 414/338 |
| 5,149,921 A | * | 9/1992 | Picado ....................... 187/317 |
| 5,186,596 A | * | 2/1993 | Boucher et al. ............ 198/303 |
| 5,531,563 A | | 7/1996 | Willis |
| 5,577,873 A | * | 11/1996 | Tanaka et al. .............. 414/280 |

FOREIGN PATENT DOCUMENTS

| DE | 94 03 105.3 | 9/1994 | |
| EP | 0 767 113 | 4/1997 | |
| EP | 0 767 113 A2 | * 4/1997 | ............ B65G/1/04 |
| EP | 0 794 135 | 9/1997 | |
| JP | 1008106 | 1/1989 | |
| JP | 8208006 | 8/1996 | |

* cited by examiner

Primary Examiner—Eileen D. Lillis
Assistant Examiner—Charles A. Fox
(74) Attorney, Agent, or Firm—John Smith-Hill; Smith-Hill and Bedell

(57) ABSTRACT

Goods units are handled in a stock area and a loading area. The stock area and the loading area are in close proximity to each other. A robot system includes a picking robot movable in the stock area for picking goods units and forming transfer piles and a moving system for moving transfer pile rows formed by the picking robot. The working area of the picking robot reaches to the stock area and the working area of the moving system reaches both to the stock area and to the loading area.

12 Claims, 3 Drawing Sheets

HANDLING ARRANGEMENT FOR GOODS UNITS AND METHOD OF HANDLING OF GOODS UNITS

BACKGROUND OF THE INVENTION

This invention relates to a handling arrangement for goods units, which comprises a goods units stock area and a goods units loading area arranged directly adjacent each other and a robot system. The robot system comprises a picking robot movable in the stock area for picking goods units and forming rows of transfer piles, and a moving system for moving the rows of transfer piles. The working area of the picking robot extends to the stock area.

The invention also relates to a method of handling goods units in a stock area and a loading area, using a picking robot which is movable in the stock area and picks the goods units and forms rows of transfer piles and a moving system which moves the transfer pile rows from the stock area to the loading area.

Shipping quantities of good units based on customer orders are collected in dispatch or shipping departments of production plants of breweries, slaughterhouses, dairies, bakeries and other enterprises. In manual picking, trucks and moving carriages are used to assist in the picking, but nevertheless, the work is slow because a single customer order may require several different products, which are in different locations of the stock area, so that transferring takes the largest part of the time spent. In automated picking, each product can have its own product line, from where the products are taken according to the customer order. The picking can only happen at the ends of the product lines or rows and the transport arrangement takes a large amount of space. This arrangement is functionally inflexible and requires a lot of floor area. Additionally, a large amount of equipment is needed, requiring considerable service and repair work.

If the dispatch department work is to be automated, one can buy automatic arrangements, which automatically perform the picking and the transfers inside the stock area. Because the number and size of customer orders can be large depending of the time of day and night, a large transport system is needed to transport the goods and arrange the goods at the loading area. This kind of arrangement requires a lot of floor area, preventing traffic in the area, and prolongs the working time for goods loading.

Publication FI 922028 discloses placing goods units in piles and picking goods units from piles. FI 922028 is concerned specifically with an arrangement for stocking and loading of boxes and box piles. The arrangement does not permit forming specified box piles by picking groups or sets of boxes from separate piles.

Publication FI 954688 discloses a robot system including a robot that is movable over the working area, wherein several goods units are arranged in a pile or stack. The robot comprises a vertically movable gripping apparatus, which can pick at least one goods unit from a pile or unload to a pile. In this arrangement boxes formed in piles are transported by the gripping apparatus to a transport line, which moves the piles forward finally to be loaded onto distribution cars.

These known arrangements concentrate mostly on picking the boxes themselves, and cannot control comprehensive handling of goods units. Problems of combined loading and distributing occurring after the picking are not solved by these known arrangements, whereas the invention offers a new solution to such problems.

The aim of the invention is achieve a more advanced arrangement than known systems, wherein hindrances and problems of the known art are minimized, and with the help of which the handling of goods units becomes effective. Additionally a special aim is to achieve an arrangement for goods dispatch departments, with the aid of which the manual work and the time needed for loading transport means are minimized.

SUMMARY OF THE INVENTION

According to one embodiment of the invention a handling arrangement for goods units has a stock area for goods units and a loading area for goods units. The handling arrangement includes a robot system, which comprises a movable picking robot located in the stock area for picking goods units. The picking robot may be, for example, according to Publication FI 954688. Advantageously, the arrangement further comprises a moving arrangement for moving transport pile rows formed by the picking robot. Control information, customer based goods units information (i.e. information that specifies the number of units of each item or product required by the customer) and customer based unloading information concerning a load (i.e. information specifying the order in which the different units are to be unloaded from the transport vehicle) can be supplied to control apparatus for the robot system. The picking robot is arranged to pick goods units and form customer based transport piles according to the customer based information and place the transport piles in transport pile rows by a combination function of the transport pile row transport apparatus. The stock area and the loading area are in direct or immediately proximity to each other and the working area of the picking robot reaches to the stock area; the working area of the goods pile row moving apparatus reaches both to the stock area and to the loading area. With the help of the moving apparatus, each formed transport pile row can be moved as a whole from the stock area to the loading area.

The transfer pile row moving system comprises a power or force transmitting arrangement to achieve the transfer movement of the transfer pile rows, by which power or force is transferable to, or can be applied to, all of the transfer piles of a transfer pile row. Advantageously the transfer movement is a pushing movement and the moving apparatus comprises a pusher or the like, which moves with a horizontal pushing movement from the stock area to the loading area and with a returning movement from the loading area to the stock area. The working area of the goods units picking robot extends to a transport pile row forming or assembly area, to which also extends the working area of the transport system for transport pile rows, if the working areas of the picking robot and transfer pile row transport equipment are imbricated or overlapping and the forming area is located at the stock area side. The stock area and the loading area are advantageously separated by a wall or the like.

According to an optional feature of the method of the invention for the handling of goods units in the stock area and for the loading of goods unit to a transport vehicle in the loading area, goods units arriving at the stock area with transport apparatus can be stored in the stock area with the help of the robot system in product piles located beside each other and including the same articles. The robot system picks goods units from the product piles to form transport piles including different goods units. From the transport piles one forms in a predetermined sequence several transport pile rows, which are moved by the transport means in the order in which they are formed to the load. According to this feature the robot system comprises a movable robot in the stock area for picking goods units, a transfer pile row transport apparatus and a control apparatus which controls the function of the robot system. Customized goods unit information and customized discharge information of the load in dropping or distribution order are fed to the robot system's control apparatus as control data. In this manner, one can discharge from the load the exact amount of each customer's ordered goods in the right order. By forming the transport pile rows in accordance with the customer based goods unit information and customer based unloading information, the goods units can be loaded onto the transport vehicle in a last off, first on sequence, so that the goods units can easily be unloaded in the order required by the customer without goods units that should be unloaded earlier being blocked by goods units that are to be unloaded later. The picking robot picks and forms customized transfer piles according to this information and deposits them in transfer pile rows in operational connection with the transfer pile row moving apparatus. The transfer pile row moving apparatus also forms transfer assemblies from sequential transfer pile rows, which are arranged according to the load discharge information, i.e. information on how to discharge the load for each customer.

Transport assemblies may be formed such that the transport pile row transfer equipment moves the transport pile row already formed by the picking robot forward towards the loading area at least so far as to leave enough space to accommodate the next formed transport pile row.

Several advantages are achieved with the invention. The arrangement according to the invention is able to solve the picking problem of many foodstuff dispatch departments without any manual operating stages. A stream of goods coming from production arrives automatically at the loading dock directly in the correct loading form and loading order. The loading phase is considerably more rapid and the possibility of error decreases, because it is not necessary to provide information separately to a car loader as to how he should carry out the loading of the car (truck or railroad car).

The invention has also clear advantages compared to existing automatic systems, where the articles are loaded on a conveyor in the picking area, e.g. in a route specific order. In this case, the conveyor arrangement has to extend as far as the loading area, in order to ensure the correct loading onto the means of transport. This arrangement requires among other things a lot of floor space, because the amount of apparatus is large and hinders or even prevents the movement of people and machines in the loading area.

BRIEF DESCRIPTION OF THE DRAWINGS

In the following the invention is described by way of example with reference to the attached drawings, in which.

DETAILED DESCRIPTION

Figure 1:
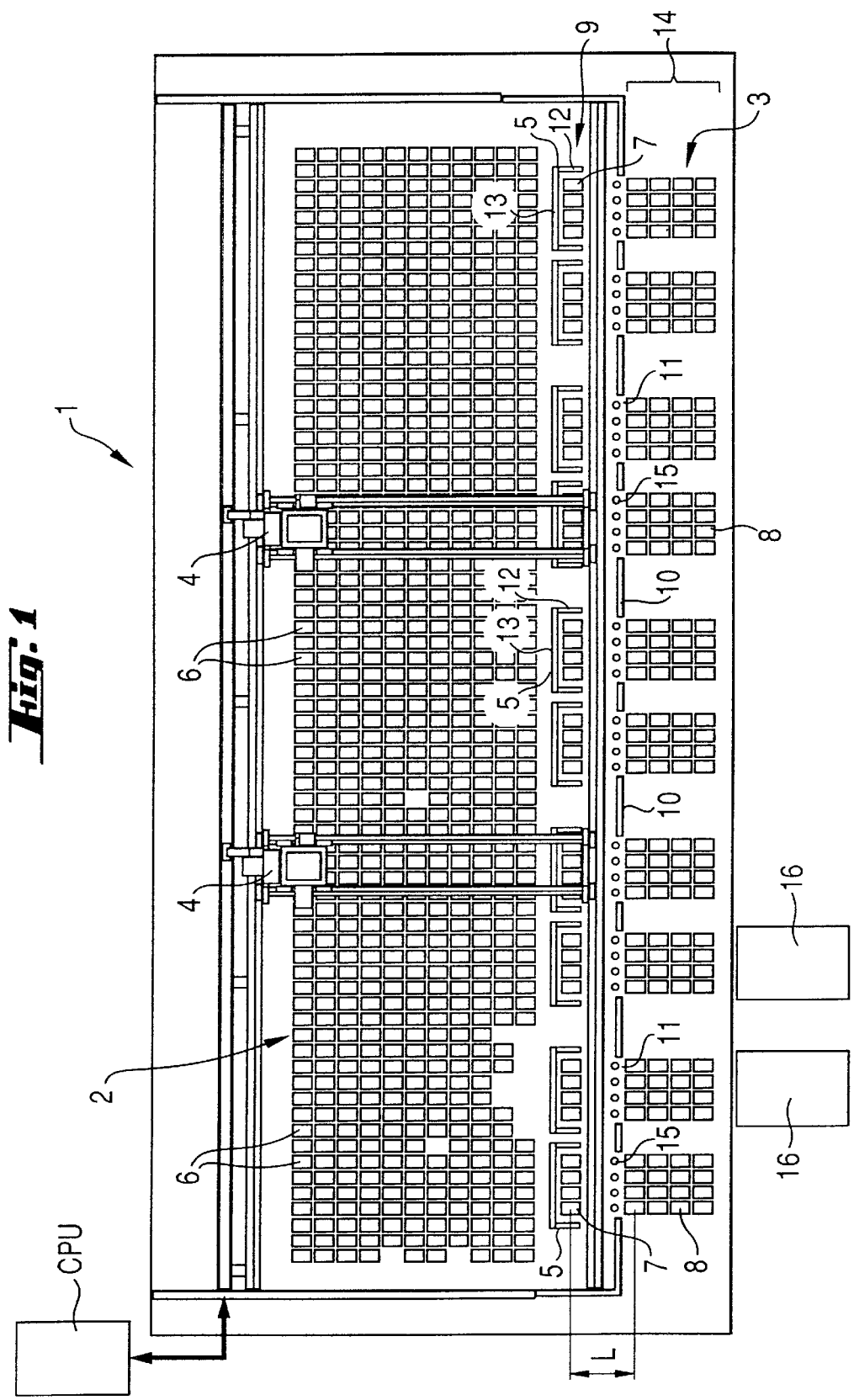
FIG. 1 is a top plan view of a handling arrangement according to the invention.
Figure 2:
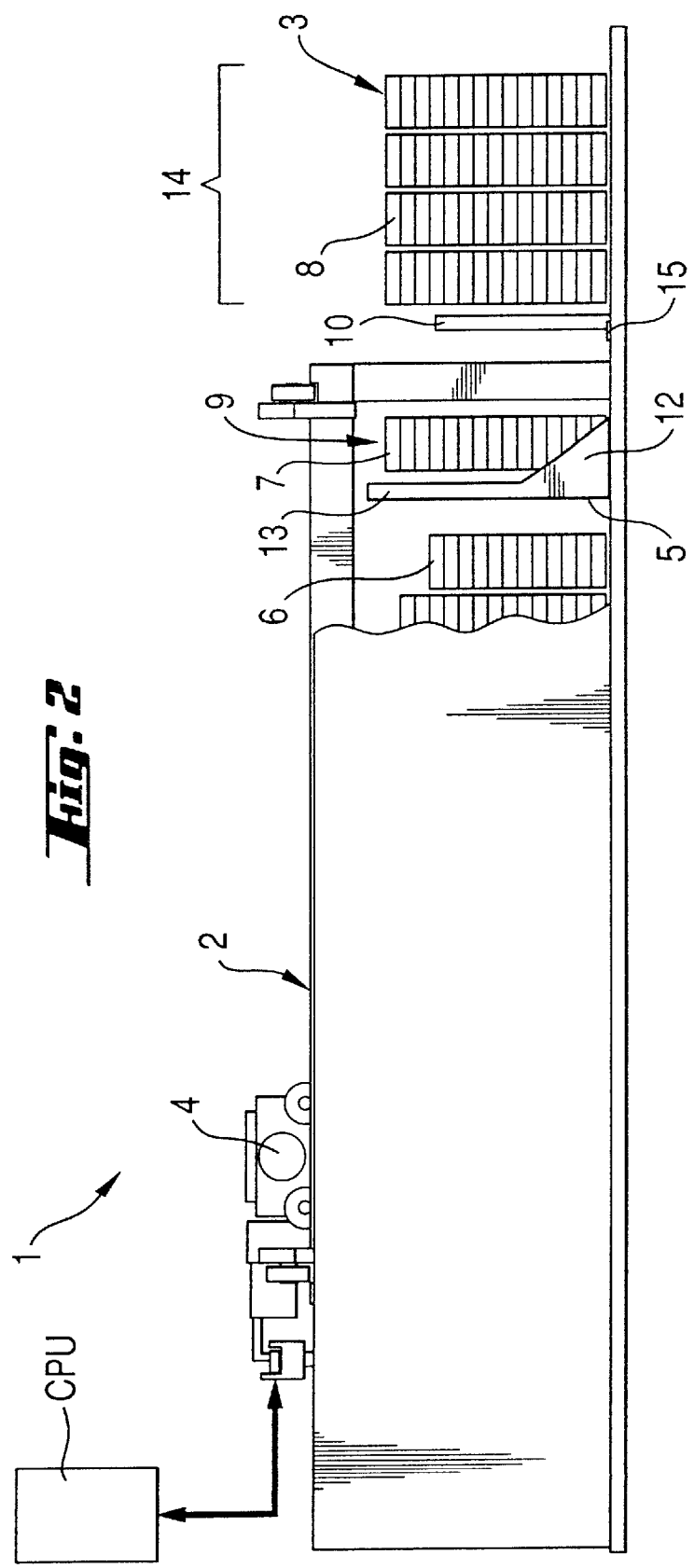
FIG. 2 is a side elevation of the handling arrangement of FIG. 1.
Figure 3:
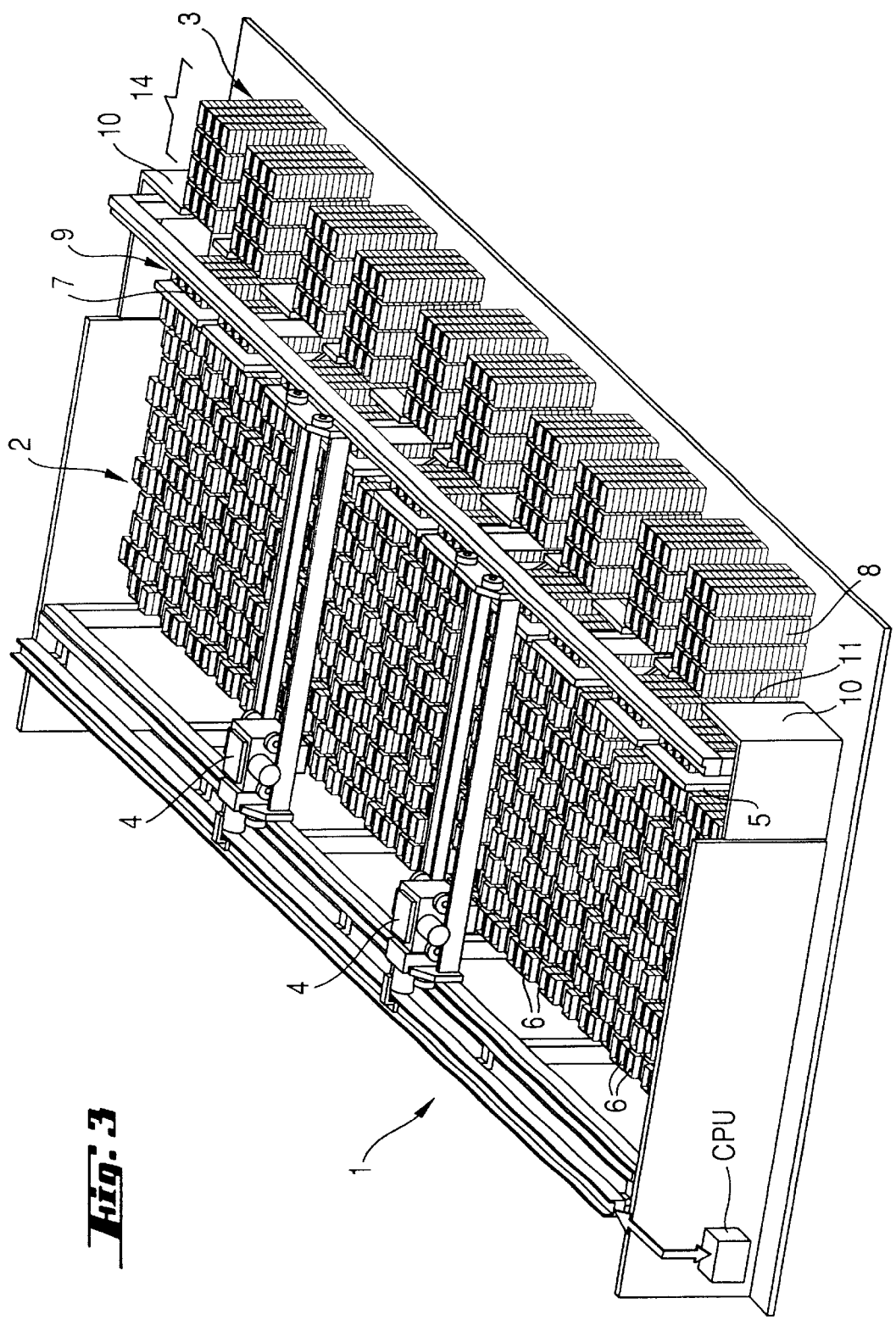
FIG. 3 is a perspective view of the handling arrangement of FIG. 1.

In FIGS. 1–3 is presented by way of example a handling arrangement 1 for goods units, which mainly comprises a stock area 2, a loading area 3 and a robot arrangement. The robot arrangement comprises a picking robot 4 which is movable in the stock area, transport pile row transfer equipment 5 associated with the picking robot 4 for moving transport pile rows, and a control system (not shown) for the robot system. The control system provides customer unit information and customer discharge information as control information, whereupon the picking robot 4 picks and forms piles 7 for a customer based on this information.

The picking robot 4 is advantageously of the type that includes a clawing or grabbing gripping device for picking units from a pile and/or discharging units to a pile from above, and a vertically movable tower-like frame, which has a loading area open from above. The tower-like frame is mounted in a carriage that is movable horizontally along two perpendicular rails. Above the loading area a substantial number of goods units stacked one upon another fit in the grasp of the lower robot. For picking units from a pile, the robot can grasp the pile at any desired height and thereby pick any number of units in a single operation. In this manner, it is possible that by guiding the movements of the gripping device in the vertical direction one can pick from a goods pile and/or unload to a goods pile one or more goods units, so that the order of the goods units is in accordance with the controlling data of the robot system's control system.

The robot may pick goods units from one or more piles to create a tranfer pile, which is carried by the robot until the transfer pile is complete, and the robot then deposits the complete pile at the forming area 9. Alternatively, the robot may pick one or more goods units from a pile 6 in the stock area and place them on a transfer pile 7 in the forming area 9 then pick one or more goods units from another pile 6 and add them to the pile 7, and so on until the transfer pile 7 is complete.

In the arrangement according to the invention the goods units can be, for example, plastic boxes containing selected articles, such as bakery products. The goods units picking robot 4 takes care of receiving plastic box piles coming from the production area, and storage of the plastic boxes in the stock area 2, to which area the working area (or range) of the picking robot 4 reaches. In the stock area 2, incoming goods units arriving on a separate conveyor apparatus (not shown) are placed with the help of the robot system in adjacent product piles. The units of a given pile each contain the same product, so that the units are interchangeable with respect to the customer order. The robot performs customized picking from the product piles 6 situated in the stock area 2 under control of the control system CPU, moving from one pile to another pile, and picking the needed amount of boxes from each pile 6 with the help of the grasping apparatus of the picking robot 4 to form the customized transfer piles 7, which can then consists of several different products. For example in the bakery embodiment one transfer pile may contain 17 boxes (each being a goods unit) and each box may contain a different type of bread.

Next, the picking robot 4 moves the transfer pile 7 and puts it in operative connection with the transfer pile rows of the moving system, in the transfer pile row forming area 9 located in the stock area. After this the picking robot carries out a new picking and places the new transfer pile 7 beside the previous transfer pile 7, thus forming a transfer pile row 8. When an entire transfer pile row 8 has been formed, the transfer pile row moving system 5 moves the entire transfer pile row 8 forward from the stock area 2 to the loading area 3 in one operation with the transfer movement L. The transfer movement L moves the row forward at least far enough to leave space for the next transfer pile row to be formed.

The transfer pile row moving system returns to its starting point with a returning movement and the picking robot 4 can then begin to form a new transfer pile row. After the new transfer pile row 7 has been formed, the new transfer pile row 7 is pushed forward by the transfer pile row moving system. The transfer movement of the new transfer pile row pushes the previous transfer pile row 7 forward. This continues until a transfer entity 14 is created, in which, with respect to the content of the load, all piles are correct, and the piles are in the channel specific order of the distribution. The transfer entity can now be moved for example to the distribution car or vehicle 16.

The working area of the transfer pile row moving system 5 extends to reach both the stock area 1 and the loading area 3, and the stock area and the loading area are arranged immediately adjacent each other. Advantageously the stock area 2 and the loading area are separated by a wall 10 or the like, there being openings 11 in the wall at the locations of the transfer pile row moving system 5. The wall can also be for example a fence, in which case each area remains visible from the other area, but it desired one can also use a fixed wall.

The transfer pile row moving apparatus 5 comprises advantageously a pusher or the like. The pusher comprises an essentially vertical pushing wall 13 disposed perpendicular to its direction of movement and side walls 12 at both ends of the pushing wall and extending in the direction of movement. The pusher is arranged to move the transfer pile row 8 from the stock area to the loading area by an essentially horizontal pushing movement. The pushing wall 13 is advantageously the height of the opening 11 and/or the height of the planned highest formed pile and essentially the width of the opening 11. This arrangement increases safety, because it restricts access to the working area of the robot arrangement while it is working. Further, this arrangement increases reliability.

When the transfer pile row assembly area 9 is empty, the transfer pile row moving apparatus acts also as a barrier to obstruct access to the assembly area 9 and the stock area 2 through the openings 11. When the first transfer pile row is already formed, no special barrier is needed, because the transfer pile row itself acts as a barrier.

According to one embodiment of the invention the robot system also includes a controlling arrangement for the transfer pile row assembly area 9. This controlling arrangement 15 is connected to data transfer controlling apparatus. The controlling arrangement 15 is arranged in connection with the transfer pile row assembly area 9. The controlling arrangement 15 registers or detects the movement of a possible target, for example a person, in the forming area and sends appropriate information to the controlling apparatus of the robot system. The assembly area controlling arrangement 15 can be for example a light curtain or other optical arrangement. This controlling arrangement is advantageously separate for each forming area, so that one is able for example interrupt the movement of transfer piles 8 only in those areas where the controlling arrangement has detected movement.

The invention is not limited to the embodiments and numerical values shown but several modifications of the invention are reasonable within the scope of the attached claims.

What is claimed is:

1. A handling arrangement for goods units, said handling arrangement having a stock area for goods units and a loading area for goods units, said stock area and said loading area being in close proximity to each other, and the handling arrangement comprising a robot system which includes a picking robot movable in the stock area for picking goods units in the stock area and forming a plurality of transfer piles in a transfer pile row within the stock area and a moving system for moving the transfer pile row as a unit from the stock area to the loading area, and wherein the working range of the picking robot extends to the stock area and the working range of the moving system extends both to the stock area and to the loading area.

2. A handling arrangement according to claim 1, comprising a control system for controlling the robot system, the control system receiving control data that specifies customized goods unit information and customized discharge information of the load, and wherein the control system controls the picking based on the control data to pick goods units in the stock area and form customized transfer piles and deposit the customized piles in transfer pile rows in operational connection with the moving apparatus.

3. A handling arrangement according to claim 2, wherein the moving system is arranged to move the transfer pile row forward towards the loading area by at least an amount such that sufficient space is vacated to receive the next formed transfer pile row, and the moving system forms transfer entities according to unloading information of the load controlled by the control system of the robot system.

4. A handling arrangement according to claim 2, wherein the robot system includes a control arrangement for the forming area, said control arrangement being adjacent the forming area to detect movement of a object into the forming area and to report to the control system for the robot system.

5. A handling arrangement claim 1, wherein the moving system comprises a force transmitting arrangement for effecting movement of a transfer pile row by simultaneously moving all the transfer piles of the transfer pile row.

6. A handling arrangement according to claim 5, wherein the moving system comprises a pusher for moving at least one transfer pile row from the stock area to the loading area in one operation with an essentially horizontal pushing movement, and wherein there is a transfer pile row forming area in the working area of the picking robot, and the transfer pile row forming area is situated in the working area of the moving system.

7. A handling arrangement according to claim 6, wherein the stock area and the loading area are separated from each other by a barrier in which an opening is formed to allow transfer pile rows to pass from the stock area to the loading area, and wherein the moving system acts also as movable obstruction for said opening.

8. A handling arrangement according to claim 7, wherein the transfer pile row forming area is situated between the stock area and the loading area barrier, and the moving system comprises a substantially vertical pushing wall which is substantially perpendicular to the direction of pushing movement and has side walls at each end aligned with the direction of pushing movement.

9. A method of handling goods units in a stock area for goods units and a loading area for goods units, employing a picking robot that is movable in the stock area to pick goods units and to form transfer pile rows and a moving system for moving the transfer pile rows, said method comprising picking the goods units in the stock area and forming customized transfer piles in the stock area, locating the transfer piles in a transfer pile row that can be acted upon as a unit by the moving system, and moving a transfer pile row forward as a unit from the stock area to the loading area to form a transfer entity composed of a plurality of transfer pile rows.

10. A method according to claim 9, comprising receiving customer oriented goods unit information and discharge information of a load, placing customer oriented transfer piles in transfer pile rows in the stock area, and moving each transfer pile row from the stock area to the loading area and thereby forming a transfer entity in the loading area.

11. A method according to claim 10, wherein the step of moving a transport pile row towards the loading area comprises moving the transfer pile row by a sufficient amount to vacate space to form a succeeding transfer pile row.

12. A method according to claim 10, comprising forming the transfer piles in a transfer pile assembly area of the stock area, detecting movement of an object in the transfer pile assembly area, and reporting such movement to a control system for the robot arrangement.

* * * * *